United States Patent [19]
Aikawa et al.

[11] Patent Number: 5,348,564
[45] Date of Patent: Sep. 20, 1994

[54] METHOD FOR MANUFACTURING A HERMETICALLY COATED OPTICAL FIBER

[75] Inventors: Haruhiko Aikawa; Katsuya Nagayama; Yoichi Ishiguro; Ichiro Yoshimura, all of Yokohama; Yutaka Katsuyama; Nobuyuki Yoshizawa, both of Mito, all of Japan

[73] Assignees: Sumitomo Electric Industries, Ltd., Osaka; Nippon Telegraph and Telephone Corporation, Tokyo, both of Japan

[21] Appl. No.: 835,892

[22] Filed: Feb. 14, 1992

[30] Foreign Application Priority Data

Feb. 14, 1991 [JP] Japan .................. 3-21042

[51] Int. Cl.⁵ .......................... C03B 37/025
[52] U.S. Cl. .......................... 65/413; 65/60.6; 65/423; 118/50.1
[58] Field of Search .............. 65/3.11, 3.12, 60.6, 65/13; 118/50.1

[56] References Cited

U.S. PATENT DOCUMENTS

| | | | |
|---|---|---|---|
| 4,713,103 | 12/1987 | Pennanen et al. | 65/3.11 |
| 5,013,130 | 5/1991 | Atkins et al. | 65/3.11 X |
| 5,062,687 | 11/1991 | Sapsford | 65/3.11 X |
| 5,147,432 | 9/1992 | Edmonston et al. | 65/3.11 |
| 5,152,817 | 10/1992 | Bennett et al. | 65/60.6 X |

FOREIGN PATENT DOCUMENTS

| | | |
|---|---|---|
| 0308143 | 3/1989 | European Pat. Off. . |
| 0402895 | 12/1990 | European Pat. Off. . |
| 3810363 | 5/1961 | Japan . |
| 2180735 | 7/1990 | Japan . |
| 2192438 | 7/1990 | Japan . |
| 2243539 | 9/1990 | Japan . |
| 2156858 | 10/1985 | United Kingdom . |

Primary Examiner—Robert L. Lindsay
Attorney, Agent, or Firm—Cushman, Darby & Cushman

[57] ABSTRACT

An apparatus for manufacturing a hermetically coated optical fiber having a single reaction chamber into which a fare fiber and raw gas are to be introduced for applying a hermetic coating to the bare fiber while the bare fiber passes through the reaction chamber is characterized by that the reaction chamber has a plurality of inlet tubes to introduce the raw gas, and the plurality of inlet tubes open to the reaction chamber at different positions from each other in a direction of movement of the bare fiber passing through said reaction chamber.

11 Claims, 2 Drawing Sheets

METHOD FOR MANUFACTURING A HERMETICALLY COATED OPTICAL FIBER

BACKGROUND OF THE INVENTION

1. Field of the Invention

The present invention relates to apparatus and method for manufacturing a hermetically coated optical fiber by coating a thin film of carbon or the like on an optical fiber spun from an optical fiber preform.

2. Related Background Art

As a technique to hermetically coat carbon to a spun bare fiber, a method for coating a carbon thin film on a surface of a bare fiber by exposing the optical fiber to a high temperature carbon gas atmosphere in a process of thinning the optical fiber has been known. (For example, see JP-B-38-10363)

Ep 0.308.143 (published on Mar. 22, 1989) discloses a method for manufacturing a hermetically coated optical fiber by guiding a thinned high temperature bare fiber into a carbon gas atmosphere in a process of spinning the optical fiber from an optical fiber preform to coat a carbon thin film on a surface of the bare fiber. In one embodiment of the disclosed method, a reaction tube having two reaction chambers is used, raw gas is separately introduced into each of the reaction chambers and the carbon thin films are coated in two steps in the respective reaction chambers.

In the past, when a hermetic coating is applied by carbon on the surface of the optical fiber, a residual stress appears in an interface of the carbon film and the optical fiber or a tensile strength of the fiber is reduced by the unevenness created on the surface of the carbon film.

In the related art, since a reaction condition such as concentration and composition of raw gas in one reaction chamber is kept constant the carbon film formed on the bare fiber has a uniform property.

Where two or more reaction chambers are provided and carbon is coated with different gas atmospheres for the respective reaction chambers as proposed by the related art, heterogeneous films with interfaces are formed because the fiber temperature varies from chamber to chamber. As a result, a distortion due to a residual stress is created at a heterogeneous phase interface and the improvement of strength is not attained.

SUMMARY OF THE INVENTION

It is an object of the present invention to continuously change a property of a hermetic coating formed on a bare fiber in a radial direction of the bare fiber.

The present invention is based on the following finding of the inventions.

When hydrocarbon and carbon halide are used as raw gas and a concentration of carbon halide is raised, a surface of a carbon film formed becomes smooth and a tensile strength of a fiber increases. However, as the concentration of carbon halide is raised, a hermetic effect of the carbon film formed reduces. After various studies on this, it has been found that the property of the carbon film formed in the reaction chamber depends on a temperature of a substrate (a temperature of a bare fiber) and flow rate, composition, concentration and temperature of the raw gas, through the control of those parameters, the property of the carbon film formed is successfully controlled. In order to achieve the above object, apparatus and method for manufacturing the hermetically coated optical fiber having the following features have been invented.

The apparatus for manufacturing the hermetically coated optical fiber of the present invention is characterized by the provision of a single reaction chamber for applying a hermetic coating to a bare fiber and a plurality of inlet tubes to introduce raw gas into the reaction chamber and that the plurality of inlet tubes open to the reaction chamber at different positions from each other in a direction of movement of the bare fiber passing through the reaction chamber. Control means for controlling at least one of flow rate, composition, concentration and temperature of the raw gas introduced into the single reaction chamber through the plurality of inlet tubes, for each of the inlet tubes may be provided, or inert gas instead of the raw gas may be introduced into the reaction chamber from at least one of the plurality of inlet tubes.

The method for manufacturing the hermetically coated optical fiber of the present invention is characterized by continuously changing at least one of flow rate, composition, concentration and temperature of the raw gas in the single reaction chamber along the direction of movement of the bare fiber when a hermetically coating is applied to the bare fiber passing through the single reaction chamber into which the raw gas is introduced.

In accordance with the present invention at least one of flow rate, composition, concentration and temperature of the raw gas in the reaction chamber for applying the hermetic coating to the optical fiber while it passes through the reaction chamber can be continuously changed in the direction of movement of the bare fiber guided into the reaction chamber so that the hermetic coating film having a continuously varying film property along the radial direction of the bare fiber can be applied to the bar fiber.

This is based on the following principle. When hydrocarbon and carbon halide are introduced as raw gas into the single reaction chamber, the higher the concentration of hydrocarbon is, the higher is a film forming temperature and the richer is a hermetic effect of the resulting film. On the other hand, when the concentration of carbon halide which has a dehydrogen effect is raised, a reaction temperature is lowered and a carbon film which has a smooth surface and enhance an initial strength of the fiber is formed.

The film forming temperature tends to be high as the fiber temperature rises and the flow rate of the raw gas increases.

In accordance with the above principle, when raw gas having a high hydrocarbon concentration is supplied to an inlet side of the high temperature bare fiber (an upstream end in the direction of movement of the bare fiber) and raw gas having a higher carbon halide concentration is supplied as the temperature of the bare fiber decreases (at it moves toward a downstream end in the direction of movement of the bare fiber) and the amount of supply of the raw gas is increased, a sufficiently thick film is formed and the carbon film having a fine structure and a high hermetic effect is formed at an interface of the bare fiber and the carbon film, and a carbon film having a smooth surface can be formed thereon without an evident boundary or step.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

Figure 1:
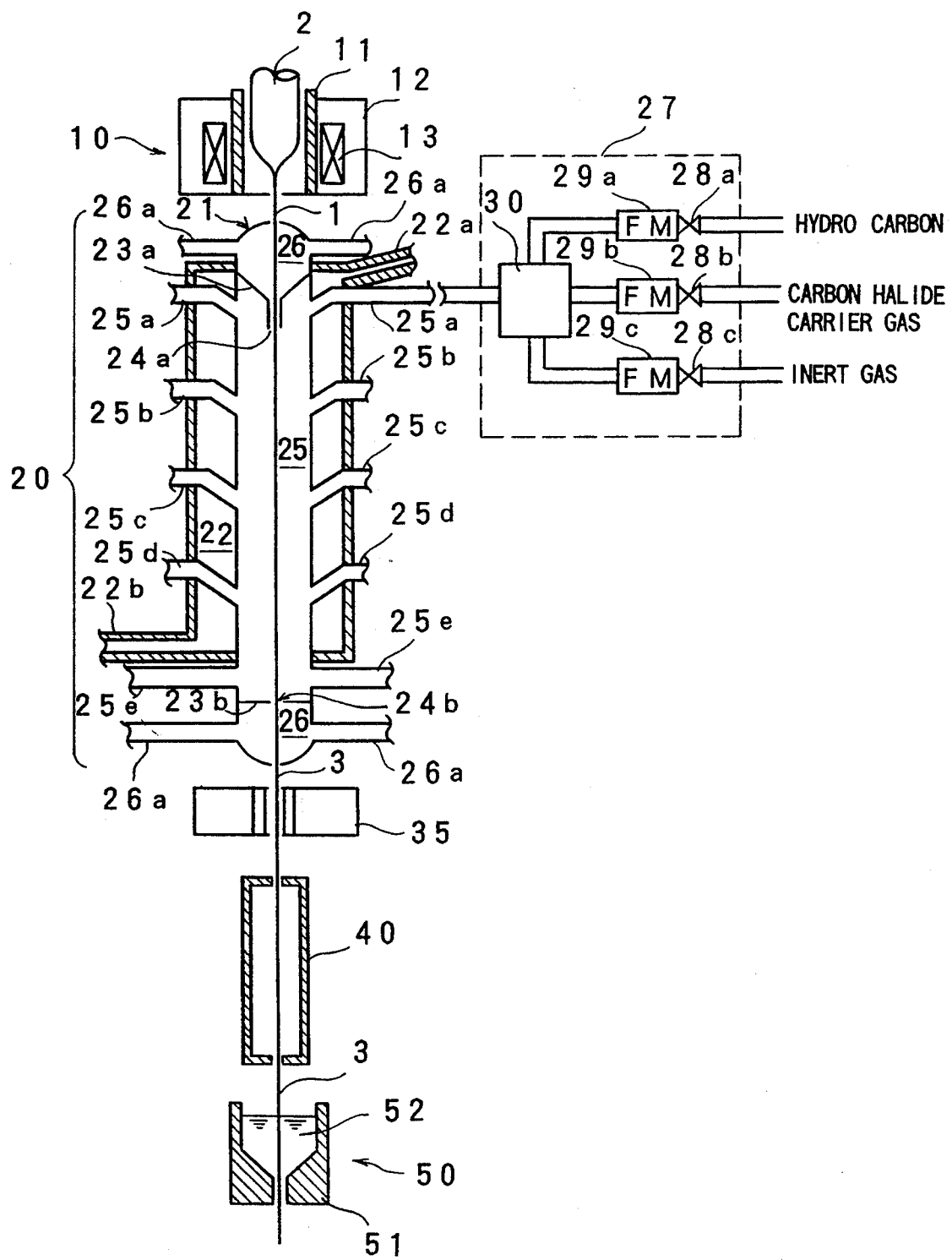
FIG. 1. shows a schematic view of one embodiment of an apparatus for manufacturing a hermetically coated optical fiber of the present invention, which is applicable to a method for manufacturing the hermetically coated optical fiber of the present invention, and FIG. 2. shows a schematic view of another embodiment of the apparatus for manufacturing the hermetically coated optical fiber of the present invention.

An embodiment of the present invention is now explained with reference to FIG. 1.

As shown, a bare fiber 1 is formed by drawing an optical fiber preform 2 by a drawing device 10. The bare fiber 1 drawn from the preform 2 is conveyed to a hermetic coating device 20 where it is hermetically coated with carbon for instance to form a hermetically coated optical fiber 3. The hermetically coated optical fiber 3 is then conveyed to a resin application device 50 through a fiber diameter monitoring device 35 and a cooling device 40 to form a resin coated optical fiber 5. The resin coated optical fiber 5 is taken up by a drum (not shown) through a capstan, or it is taken up by the drum after it is coated with nylon.

The preform 2 is hung in a tube 11 of the drawing device 10 while it is held by an arm (not shown). The tube 11 is set in a drawing oven 12 which has a heater for heating and fusing a lower end of the preform 2. The drawing oven 12 may be a known electric oven or RF oven. Preferably it does not produce hydrogen molecules or dust. The bare fiber 1 having a substantial similar distribution of refractive index to that of the preform 2 is spun from the preform 2 by the drawing device 10, and it is fed to the hermetic coating device 20 as it is.

The hermetic coating device 20 has a reaction tube 21 and a cooling jacket 22. The interior of the reaction tube 21 is partitioned by partitioning walls 23a and 23b into a single reaction chamber 25 and two seal chambers 26 formed on both upstream end and downstream end of the reaction chamber 25. The partitioning walls 23a and 23b have holes 24a and 24b, respectively, at centers thereof through which the fiber passes. Seal gas such as nitrogen $N_2$ or Ar is supplied to the seal chambers 26 through inlet tubes 26a opening thereto. A plurality of inlet tubes 25a, 25b, 25c and 25d and an exhaust tube 25e open to the reaction chamber 25 at different positions from each other in the direction of movement of the bare fiber 1 passing through the reaction chamber 25. Raw gas is supplied into the reaction chamber 25 through the inlet tubes 25a, 25b, 25c and 25d, and evacuated through the exhaust tube 25e. The flow rate, composition, concentration and temperature of the raw gas to be supplied to the reaction chamber 25 are independently controlled by control means 27 provided for each of the inlet tubes. Accordingly, at least one of the flow rate, composition, concentration and temperature of the raw gas in the reaction chamber 25 can be continuously changed along the direction of movement of the bare fiber 1 passing through the reaction chamber 25.

Figure 2:
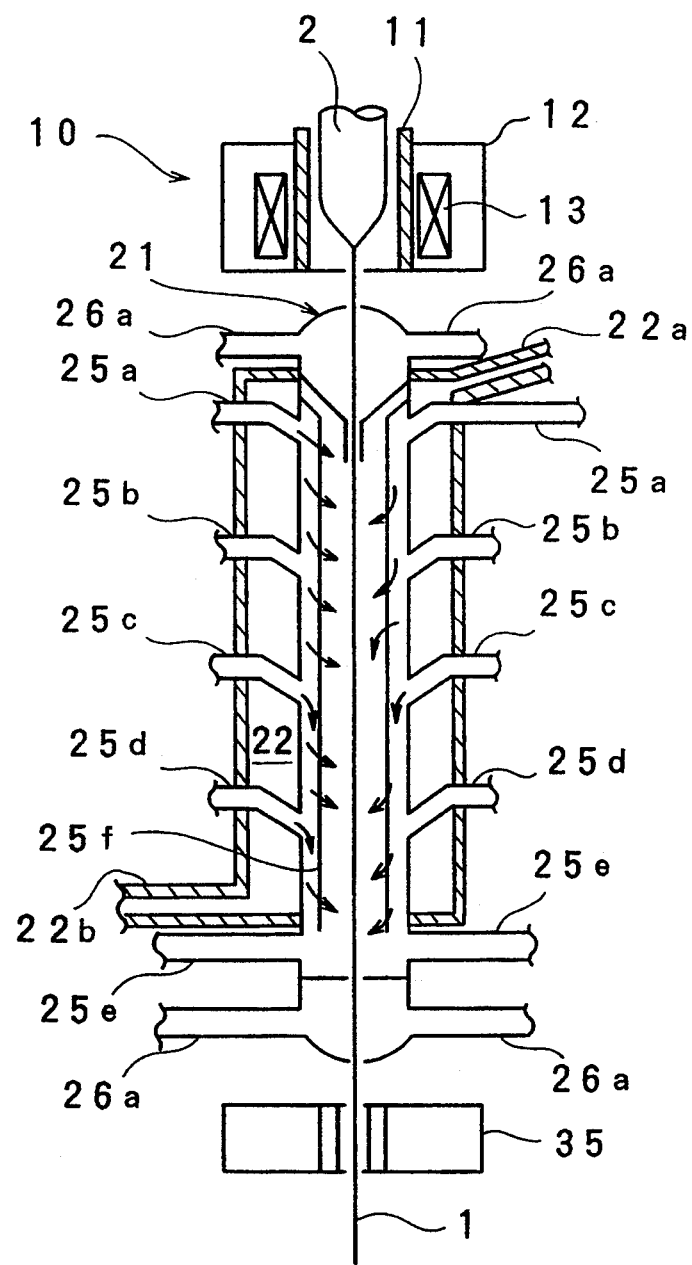

The reaction chamber 25 may be of multi-tube structure having a plurality of tube therein in order to relax the change of the raw gas blown to the bare fiber 1. FIG. 2 shows a longitudinal sectional view of another embodiment of the present invention in which a reaction chamber of double-tube structure is sectional along the direction of movement of the bare fiber. An inner tube 25f having a number of small holes formed in a surface thereof is arranged in the reaction chamber 25. As the double-tube structure, a reaction tube having an inner diameter of 40 mm and quartz tubes each having a thickness of 1.5 mm, an inner diameter of 25 mm and a small hole diameter of 1–2 mm with a pitch of 5 mm may be used. The bare fiber 1 is moved along a center axis of the inner tube 25f. Thus, the raw gas passes through the small holes and is blown to the surface of the bare fiber 1. As a result, #1 the velocity difference of gas articles at the upstream end and the downstream end of the raw gas is unified, and #2 the raw gas is uniformly supplied to the bare fiber in the depthwise direction of the formed film. Accordingly, even if the openings of the inlet tubes 25a, 25b, 25c, 25d and 25e are not arranged symmetrically along the circumference, the change of the raw gas atmosphere is relaxed and the film is uniformly formed along the circumference of the bare fiber 1.

The control means 27 comprises mass flow valves 28a, 28b and 28c communicated with the supply source (not shown) of raw gases (for example, hydrocarbon such as ethylene or acetylene, carbon halide such as carbon tetrachloride, hydrocarbon halide, chloroform or trichloroethylene) and inert gas such as $N_2$, He or Ar which is used as diluent gas, mass flowmeters 29a, 29b and 29c for metering flow rates of gases passing through the mass flow valves, and a mixing chamber 30 for mixing gases passing through the mass flowmeters. A thermometer for measuring a temperature of the internal gas and a temperature control unit such as a heater for heating the internal gas are arranged in the mixing chamber 30. As a result, the flow rate, composition, concentration and temperature of the raw gases supplied into the reaction chamber 25 from the mass flow valves through the inlet tubes 25a, 25b, 25c, and 25d can be controlled independently for each inlet tube. The raw gases having the composition thereof controlled are fully mixed in the mixing chamber 30 and then they are supplied to the reaction chamber 25. Only inert gas may be supplied into the reaction chamber 25 through at least one of the inlet tubes 25a–25d by the control of the control means 27 so that the concentration of the raw gas in the reaction chamber 25 may be continuously changed along the direction of movement of the bare fiber 1.

Hydrogen or chlorine may be added to the raw gas to be introduced into the reaction chamber 25 to control the content of hydrogen atoms or chlorine atoms in the raw gas.

Gas such as helium, nitrogen or air, or liquid such as water or alcohol is supplied as coolant from the inlet tube 22a into the cooling jacket 22 mounted around the reaction tube 21 to cover the reaction chamber 25, and it circulates through the exhaust tube 22b. In this manner, a side wall of the reaction tube facing the reaction chamber 25 is maintained at a constant temperature.

The fiber diameter monitoring device 35 arranged below the hermetically coating device 20 measures an outer diameter of the hermetically coated optical fiber 3 by a laser beam. The fiber diameter of the bare fiber 1 is controlled based on the measurement. The cooling device 40 there below is used to cool the hermetically coated optical fiber to, for example, 70° C. The cooling device 40 may comprise a cylinder having a length of 30 cm and an inner diameter of 1.5 cm, and cooling helium gas is supplied therein to at a rate of 10 litters per minute. The resin application device 50 arranged below the cooling device 40 comprises a die 51 which is filled with resin 52. The hermetically coated optical fiber 3 is coated with the resin 52 while it passes through the die 51 to form the resin coated optical fiber 13.

An experimental result of the hermetic coating to the bare fiber 1 by carbon by the above apparatus is explained below.

In the experiment, ethylene $C_2H_4$ was used as raw gas for hydrocarbon, and carbon tetrachloride $CCl_4$ was used as raw gas for carbon halide. Since carbon tetrachloride $CCl_4$ is in liquid phase under room temperature and room pressure, it was evaporated by an evaporator at 30° C. (constant) and helium He was used as carrier gas. Nitrogen $N_2$ gas was used as diluent gas. The compositions and flow rates of the raw gases supplied into the reaction chamber 25 from the inlet tubes 25a, 25b, 25c and 25d were set as follows.

TABLE 1

| Inlet tube | $C_2H_4$ | Carrier Gas (of $CCl_4$) |
|---|---|---|
| 25a | 80 cc/min | 120 cc/min |
| 25b | 60 cc/min | 140 cc/min |
| 25c | 40 cc/min | 160 cc/min |
| 25d | 20 cc/min | 180 cc/min |

Thus, the raw gas having a higher hydrocarbon concentration is supplied into the reaction chamber at the inlet end of the high temperature bare fiber (upstream end), and the raw gas having a higher carbon halide concentration is supplied as it goes toward the downstream end along the direction of movement of the bare fiber.

The drawing speed of the bare fiber was 150 m/min, the temperature of the reaction tube wall was kept at 100° C. and the flow rate of the seal gas ($N_2$) to the two seal chambers 26 was set to 3 litter/min.

Under such a condition, carbon was hermetically coated and a carbon film having a fine structure and a high hermetic effect was formed at an interface of the bare fiber and the carbon film, and a carbon film having a smooth surface was formed thereon without clear boundary or step. As a result, a mean value of an initial strength of the resulting hermetically coated optical fiber was no smaller an 6.0 kgf, and a tensile strength was equal to or higher than that of a conventional optical fiber without carbon hermetic coating. This is approximately 20% increase over the related art carbon coated optical fiber. A fatigue parameter n was as high as 100 or higher and there was no increase of transmission loss (1.24 µm) by hydrogen after the optical fiber had been left in a hydrogen atmosphere (80° C., 1 atm) for 20 hours. It exhibited a very good waterproof property and hydrogen-proof property.

For comparison purpose, characteristics of a carbon coated optical fiber manufactured by supplying the raw gas into the reaction chamber 25 only from the inlet tube 25a while the inlet tubes 25b, 25c and 25d of the apparatus shown in FIG. 1 were closed are shown below.

(1) Ethylene $C_2H_4$ as the raw gas was supplied at 200 cc/min into the reaction chamber and $CCl_4$ carrier gas (He) was supplied at 300 cc/min.

| Tensile strength: | 4.5–5.0 kgf |
|---|---|
| Fatigue index (n): | 100 or higher |
| Increase of transmission loss by hydrogen: | 0 dB/km |

(2) Ethylene $C_2C_2$ as the raw gas was supplied at 100 cc/min into the reaction chamber, and $CCl_4$ carrier gas (He) was supplied at 400 cc/min.

| Tensile strength: | 6.0–6.5 kgf |
|---|---|
| Fatigue index (n): | 100 or higher |
| Increase of transmission loss by hydrogen: | 0.1–0.4 dB/K |

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A method of manufacturing a hermetically coated optical fiber comprising the steps of:
    passing a bare optical fiber through a single reaction chamber;
    introducing a first raw material gas into an upstream portion of the reaction chamber through a first inlet tube;
    introducing a second raw material gas into a downstream portion of the reaction chamber through a second inlet tube; and
    controlling at least one of flow rate, composition, concentration and temperature of the first and second raw material gasses before they are introduced into the reaction chamber, wherein the first raw material gas is different from the second raw material gas in at least one of flow rate, composition, concentration and temperature before the raw material gasses are introduced into the reaction chamber, whereby at least one of the flow rate, the composition, the concentration and the temperature of the raw material gas in the reaction chamber varies continuously from the upstream portion to the downstream portion.

2. A method of manufacturing a hermetically coated optical fiber according to claim 1, wherein the first and second raw material gasses each comprise a hydrocarbon and a carbon halide, a concentration of the hydrocarbon in the first raw material gas being greater than a concentration of the hydrocarbon in the second raw material gas and a concentration of the carbon halide in the second raw material gas being greater than a concentration of the carbon halide in the first raw material gas, whereby the concentrations of the hydrocarbon and the carbon halide in the reaction chamber varies continuously from the upstream portion to the downstream portion.

3. A method of manufacturing a hermetically coated optical fiber according to claim 1, wherein a third raw material gas is introduced into a portion of the reaction chamber between the upstream portion and the downstream portion through a third inlet tube, and the third raw material gas is different from the first and second raw material gasses in at least one of flow rate, composition, concentration and temperature before the gasses are introduced into the reaction chamber.

4. A method of manufacturing a hermetically coated optical fiber according to claim 3, wherein a fourth raw material gas is introduced into a portion of the reaction chamber between the upstream portion and the downstream portion in a fourth inlet tube, and the fourth raw material gas is different from the first, second and third raw material gasses in at least one of flow rate, composition, concentration and temperature before the gasses are introduced into the reaction chamber.

5. A method of manufacturing a hermetically coated optical fiber according to claim 1, wherein the first and second raw material gasses comprise ethylene, acetylene, carbon halide or hydrocarbon halide, or a mixture of two or more thereof.

6. A method for manufacturing a hermetically coated optical fiber according to claim 1, wherein chlorine or hydrogen is mixed with the raw material gas.

7. A method for manufacturing a hermetically coated optical fiber according to claim 5, wherein chlorine or hydrogen is mixed with the raw material gas.

8. A method for manufacturing a hermetically coated optical fiber according to claim 1, wherein a carbon film is hermetically coated to the bare fiber.

9. A method for manufacturing a hermetically coated optical fiber according to claim 5, wherein a carbon film is hermetically coated to the bare fiber.

10. A method for manufacturing a hermetically coated optical fiber according to claim 6, wherein a carbon film is hermetically coated to the bare fiber.

11. A method for manufacturing a hermetically coated optical fiber according to claim 1, wherein said first raw material gas has a high hydrocarbon concentration and said second raw material gas has a high carbon halide concentration.

* * * * *